(12) United States Patent
Kameda et al.

(10) Patent No.: US 8,281,827 B2
(45) Date of Patent: Oct. 9, 2012

(54) PNEUMATIC TIRE

(75) Inventors: Norifumi Kameda, Hiratsuka (JP);
Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 529 days.

(21) Appl. No.: 12/266,350

(22) Filed: Nov. 6, 2008

(65) Prior Publication Data

US 2010/0108212 A1    May 6, 2010

(51) Int. Cl.
*B60C 11/24*    (2006.01)
(52) U.S. Cl. ............... 152/154.2; 152/511; 152/512; 152/539; 152/547
(58) Field of Classification Search ............ 152/154.2, 152/450, 151, 209.5, 524, 525, 537, 538, 152/547, 548, 564, 510, 511, 512, 539; 156/64, 156/67
See application file for complete search history.

(56) References Cited

U.S. PATENT DOCUMENTS

| | | | | |
|---|---|---|---|---|
| 4,074,742 A | * | 2/1978 | Chamblin ............... | 152/154.2 |
| 4,095,637 A | * | 6/1978 | Krishnan ............... | 152/323 |
| 4,969,350 A | * | 11/1990 | Fogal, Sr. ............... | 73/40.7 |
| 5,303,756 A | * | 4/1994 | Hill ............... | 152/154.2 |
| 5,573,611 A | * | 11/1996 | Koch et al. ............... | 152/152.1 |
| 5,704,999 A | * | 1/1998 | Lukich et al. ............... | 152/154.2 |
| 5,992,486 A | * | 11/1999 | Katsuki et al. ............... | 152/510 |
| 6,062,283 A | * | 5/2000 | Watanabe et al. ............... | 152/510 |
| 6,093,271 A | * | 7/2000 | Majumdar ............... | 156/116 |
| 6,220,199 B1 | * | 4/2001 | Williams ............... | 116/208 |
| 6,221,453 B1 | * | 4/2001 | Majumdar ............... | 428/40.2 |
| 6,291,588 B1 | * | 9/2001 | Nahmias et al. ............... | 525/132 |
| 6,402,867 B1 | * | 6/2002 | Kaido et al. ............... | 156/123 |
| 6,431,236 B1 | * | 8/2002 | Kanenari et al. ............... | 152/450 |
| 6,494,543 B1 | * | 12/2002 | Hashimura et al. ............... | 301/95.101 |
| 7,128,799 B2 | * | 10/2006 | Majumdar ............... | 156/245 |
| 7,194,781 B1 | * | 3/2007 | Orjela ............... | 15/250.001 |
| 7,556,074 B2 | * | 7/2009 | Borot ............... | 152/152.1 |
| 2003/0173011 A1 | * | 9/2003 | Tsuda et al. ............... | 152/209.26 |
| 2003/0196738 A1 | * | 10/2003 | Kobayashi et al. ............... | 152/517 |
| 2004/0084120 A1 | * | 5/2004 | Arnold et al. ............... | 152/151 |
| 2005/0211351 A1 | * | 9/2005 | Majumdar et al. ............... | 152/154.2 |
| 2005/0217774 A1 | * | 10/2005 | Borot ............... | 152/152.1 |
| 2006/0005904 A1 | * | 1/2006 | Helt et al. ............... | 152/154.2 |
| 2006/0208863 A1 | * | 9/2006 | Kuwajima ............... | 340/442 |
| 2006/0231181 A1 | * | 10/2006 | Roder et al. ............... | 152/154.2 |
| 2006/0254687 A1 | * | 11/2006 | Sandstrom ............... | 152/504 |
| 2008/0029192 A1 | * | 2/2008 | Hattori ............... | 152/152.1 |

FOREIGN PATENT DOCUMENTS

| | | | |
|---|---|---|---|
| EP | 117834 A1 | * | 9/1984 |
| JP | 2007297036 A | * | 11/2007 |
| WO | WO 2004/014671 A1 | | 2/2004 |

* cited by examiner

*Primary Examiner* — Joseph Del Sole
*Assistant Examiner* — Seyed Masoud Malekzadeh
(74) *Attorney, Agent, or Firm* — Greer, Burn & Crain, Ltd.

(57) ABSTRACT

Provided is a pneumatic tire enabling an easy estimation of the presence or absence of an internal failure of the tire only by the observation of the external appearance of the tire, by interposing a detection layer mainly composed of at least one of a thermoplastic elastomer and a thermoplastic resin, which has a softening point of 50° C. to 150° C., in an interlayer between materials constituting the tire.

14 Claims, 1 Drawing Sheet

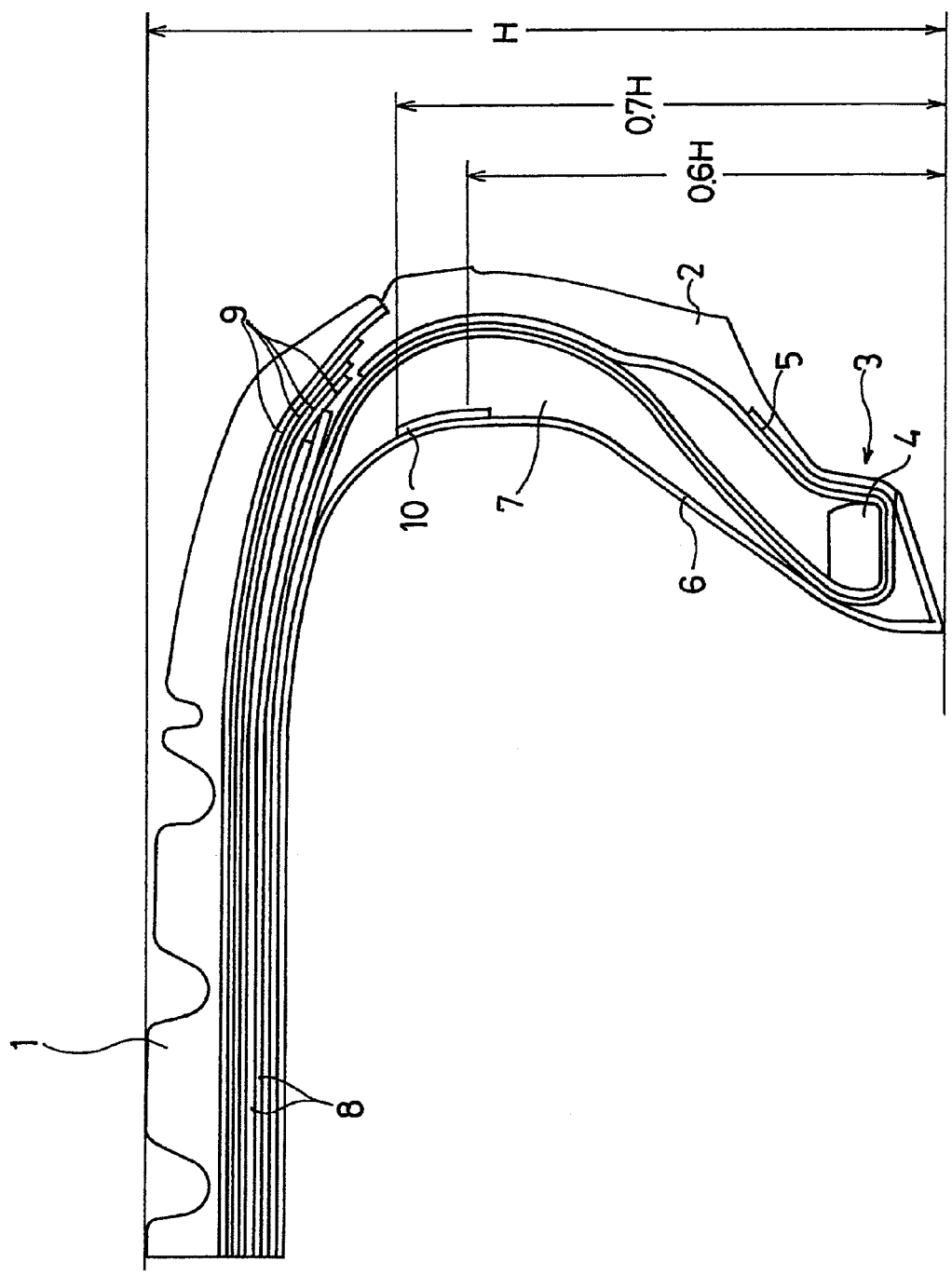

PNEUMATIC TIRE

BACKGROUND OF THE INVENTION

1. Field of the Invention

The present invention relates a pneumatic tire and more particularly to a pneumatic tire which allows the estimation of an internal failure of the tire only from the observation of the external appearance of the tire.

2. Description of the Related Art

For example, when a pneumatic tire goes flat and run-flat driving continues with zero inflation pressure, the tire is subject to a large local load, so that temperature of the surface and inside of the tire increases, and this may cause troubles such as thermal deterioration of carcass cords and belt edge separation. However, it is very difficult for a mechanic or the like to detect during repairing a flat tire whether or not there is an internal failure only by observing the external appearance of the flat tire.

Pamphlet of WO 2004/014671 proposes a method for estimating a failure of a run-flat tire using a detection unit. In this method, the detection unit is disposed in the tire to measure ambient temperature in the cavity of the tire, so that an abnormal temperature increase is detect. However, this method has a problem that a signal converter, a transmitter, a receiver, and the like must be provided in addition to the temperature sensor and not only cost but also weight increases.

SUMMARY OF THE INVENTION

An object of the present invention is to provide a pneumatic tire which allows the estimation of an internal failure of the tire only from the observation of the external appearance of the tire.

An aspect of the present invention for achieving the above-described object is that a detection layer mainly composed of at least one of a thermoplastic elastomer and a thermoplastic resin having a softening point of 50° C. to 150° C. is interposed between layers of materials constituting the tire.

In the pneumatic tire of the present invention, a detection layer formed of at least one of a thermoplastic elastomer and a thermoplastic resin which soften at 50° C. to 150° C. is inserted between layers of materials constituting the tire, so that when the temperature of the tire abnormally increases due to run flat driving after blowout and the like, the detection layer softens whereby detachment occurs between layers, and a viewable bulge occurs on an outer surface of the tire corresponding to the portion where the detachment occurs. Therefore, when repairing the tire after the run flat driving, it is possible to estimate the occurrence of an internal failure of the tire by checking the presence of the bulge, and to replace the flat tire for a new one to avoid a serious accident.

BRIEF DESCRIPTION OF THE DRAWINGS

FIG. 1 is a half cross-sectional view, in a tire meridian direction, of an example showing a pneumatic tire of the present invention.

DETAILED DESCRIPTION OF THE PREFERRED EMBODIMENTS

In the present invention, the position of a detection layer to be disposed between layers of materials constituting a tire is not particularly limited. However, it is preferable that the position be selected near a carcass layer constituting a tire frame. For the position of a detection layer, it is possible to select, for example, an interlayer located closer to the center of the tire than the carcass layer, an interlayer located farther from the center of the tire than the carcass layer, and both interlayers located closer to and farther from the center of the tire than the carcass layer. It is preferable that the detection layer be continuously disposed in a tire circumferential direction so that it is placed circumferentially around the tire; however, it may be possible to dispose intermittent detection layers so that the every two adjacent detection layers are placed some distance apart.

When disposing a detection layer in an interlayer located farther from the center of the tire than the carcass layer, the detection layer is preferably disposed between the carcass layer and a side wall. Further, when disposing a detection layer in an interlayer located closer from the center of the tire than the carcass layer, the detection layer is preferably disposed between the carcass layer and an inner liner. However, when interposing a tie rubber between the carcass layer and an inner liner, it is preferable to dispose the detection layer between the inner liner and the tie rubber. Particularly, for a run-flat tire with a reinforcing rubber inserted therein on the inside of the carcass layer, the reinforcing rubber being formed of hard rubber having a crescent-shaped section, it is preferable to dispose the detection layer between the inner liner and the reinforcing rubber.

As for a disposing position of a detection layer in the tire radial direction, the detection layer is preferably disposed in a region extending at least by 0.6×H to 0.7×H from the end of the bead portion in a tire radial direction, where H represents a section height of the tire (refer to FIG. 1). So long as the detection layer is disposed in the region extending at least by 0.6×H to 0.7×H, the detection layer may be extended outside of this region. Since this region is one on which bending deformation is most likely to occur at the time of running, a tire failure tends to occur and, particularly, a large amount of heat is developed at the time of run flat driving, thus enabling a precise estimation as to whether there is an internal failure. Incidentally, the height H of the cross-section of a tire is a value obtained by measuring the tire according to the JATMA specification.

For the types of pneumatic tires to which the present invention is applied, the invention is applicable to any one of a tire for passenger car and a tire for heavy duty vehicle. Particularly, the invention is most preferably applicable to a tire having a run flat structure.

Major constituents of the detection layer are at least one of a thermoplastic elastomer and a thermoplastic resin, softening points of which are from 50° C. to 150° C. The softening points of the thermoplastic elastomer and thermoplastic resin are preferably from 90° C. to 150° C., and more preferably from 110° C. to 150° C. When the softening point is less than 50° C., a detachment may occur on the detection layer due to temperature increase at the time of normal driving. When the softening point is more than 150° C., a detachment may not occur on the detection layer even if the detection layer is subject to high temperature at the time of run flat driving, so that an internal failure may not be estimated. The softening point can be adjusted by changing the composition of at least one of a thermoplastic elastomer and a thermoplastic resin.

In the invention, the softening point is assumed to be a glass transition temperature or a melting point which is measured, with use of a differential scanning calorimeter (DSC), under the condition of temperature rising rate of 10° C./min. Accordingly, the softening point being from 50° C. to 150° C. means that, at least one of the glass transition temperature and the melting point is in the range of 50° C. to 150° C. Further, when forming the detection layer using compositions constituted of at least one of a thermoplastic elastomer and a thermoplastic resin, a plurality of any of glass transition temperatures and melting points may occur, but even in such a case, it is only necessary that, at least one of the glass transition temperature and the melting point be in the range of 50° C. to 150° C.

A thickness of the detection layer is preferably from 5 μm to 500 μm, and more preferably from 5 μm to 100 μm. When the thickness of the detection layer is smaller than 5 μm, a crosslinking agent moves from an adjacent rubber layer and material property of the detection layer change at the time of vulcanization. Thus, softening point of the detection layer increases, so that the detachment does not occur at a desired temperature. In addition, when the thickness of the detection layer is more than 500 μm, it is not preferable since the tire becomes heavy.

The detection layer is formed of a thermoplastic composition constituted of materials mainly composed of at least one of a thermoplastic elastomer and a thermoplastic resin, and any one of the thermoplastic elastomer and the thermoplastic resin may be used, or a mixture thereof may also be used. Further, a plurality of types of thermoplastic elastomer may be used, or a plurality of thermoplastic elastomers which are of the same type but have different glass transition temperatures or melting points may be used. Similarly, a plurality of types of thermoplastic resins may be used, or a plurality of thermoplastic resins which are of the same type but have different glass transition temperatures or melting points may be used.

There is no particular limitation on thermoplastic elastomers, and a styrene elastomer, an olefin elastomer, a polyester elastomer, a polyamide elastomer, a urethane elastomer, and the like. Of these elastomers, a styrene elastomer and an olefin elastomer are particularly preferable. A styrene-ethylene-butadiene-styrene (SEBS) block copolymer and its maleic acid modified product and an epoxy modified product are preferable, and particularly, an epoxy styrene-ethylene-butadiene-styrene block copolymer is preferable.

There is no particular limitation on thermoplastic resins, and examples of the thermoplastic resin include a polyamide resin, a polyester resin, a polycarbonate resin, a polyolefin resin, a polystyrene resin, a polynytril resin, a polyvinyl resin, a polyacrylate resin, and a polymethacrylate resin. Of these resins, a polystyrene resin, a polyolefin resin, and a polyester resin are particularly preferable. Among polyester resins, an aliphatic polyester resin is more preferable.

For thermoplastic compositions forming the detection layer, when mixing a thermoplastic elastomer and a thermoplastic resin for use, a ratio of mixture may be arbitrary, but the ratio for thermoplastic elastomer is preferably 50 to 95 parts by weight and the ratio for thermoplastic resin is preferably 50 to 50 parts by weight. Further, a thermoplastic composition preferably does not contain a crosslinking agent, and even when containing a crosslinking agent, the ratio of the composition of the crosslinking agent is preferably not more than 0.1 parts by weight relative to 100 parts by weight of thermoplastic elastomer. The reason why the crosslinking agent contained in the thermoplastic composition is limited is that material characteristics change at the time of vulcanization formation, and the softening point of the detection layer increases, so that the detachment may not occur at a desired temperature.

Further, in the thermoplastic composition forming the detection layer, tackifier may be compounded. For the tackifier, 5 to 120 parts by weight of an arbitrary agent used for a common adhesive, an adhesion bond, or the like is preferably compounded with 100 parts by weight of thermoplastic composition.

FIG. 1 is a half cross-sectional view, in a tire meridian direction, of an example in the case where a pneumatic tire of the present invention is applied to a run-flat tire.

In FIG. 1, reference numeral 1 denotes a tread portion, 2 a sidewall, and 3 a bead portion. A carcass layer 5 is internally disposed so that the layer 5 is extended along the tread portion 1, the sidewall 2, and the bead portion 3, and both ends of the carcass layer 5 are folded back around bead cores 4 of the bead portions 3 from the inside to the outside of the tire. On the tread portion 1, a pair of upper and lower belt layers 8 are disposed, on the outside of the carcass layer 5, circumferentially around the tire, and further, four belt cover layers 9 are disposed, on the outside of the pair of belt layers 8, circumferentially around the tire. On an innermost side of the tire, an inner liner 6 which is an air permeation preventive layer is attached, and a reinforcing rubber layer 7 formed of hard rubber having a crescent-shaped section is disposed between the inner liner 6 and the carcass layer 5 of the sidewall 2. In addition, between the inner liner 6 and the carcass layer 5, a tie rubber layer not shown may be inserted as an adhesive layer.

In the above-described configuration, between the inner liner 6 and the reinforcing rubber layer 7, detection layer 10 which is formed of at least one of a thermoplastic elastomer and a thermoplastic resin, the softening point thereof being from 50° C. to 150° C., are interposed circumferentially around the tire by one round. For the position of the detection layer 10 in a tire radial direction, the detection layer 10 are disposed in a region extending by 0.6×H to 0.7×H from the end of the bead portion in a tire radial direction, where H represents a section height of the tire. When the above-described tire blows out and run flat driving continues, the temperature of the tire increases; consequently, when the temperature of a detection layer 10 reaches the softening point, the detection layer 10 is softened and the inner liner 6 is detached from the reinforcing rubber layer 7. Due to this detachment, the inner liner 6 on the position of the detection layer 10 bulges out, so that one can easily observe the failure.

There is no particular limitation on materials constituting the inner liner 6, and a rubber composition mainly composed of butyl-rubber can also be used, but more preferably, a thermoplastic elastomer composition (C) which an elastomer (B) is blended with a thermoplastic elastomer (A) or a thermoplastic resin (A) may be used. This is because an inner liner formed of the thermoplastic elastomer composition (C) is easily detached from the detection layer.

Examples of the thermoplastic resin (A) used for the inner liner include: polyamide resins [e.g., nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD 6, nylon 6T, nylon 6/6T copolymer, nylon 66/PP copolymer, nylon 66/PPS copolymer], polyester resins [e.g., aromatic polyester such as polybutylene terephthalate (PBT), polyethylene terephthalate (PET), polyethylene isophthalate (PEI), polybutylene terephthalate/tetramethylene glycol copolymer, PET/PEI copolymer, polyallylate (PAR), polybutylene naphtahalate (PBN), liquid crystal polyester, polyoxyalkylene dimide diacid/polybutylene terephthalate copolymer, and the like], polynitrile resins [e.g., polyacrylonitrile (PAN), polymethacrylonitrile, acrylonitrile/styrene copolymer (AS), methacrylonitrile/styrene copolymer, methacrylonitrile/styrene/butadiene copolymer], poly (meth) acrylate resins [e.g., polymethylmethacrylate (PMMA), polyethylmethacrylate, ethylene ethyl acrylate copolymer (EEA), ethylene acrylate copolymer (EAA), ethylene methyl acrylate resin (EMA)], polyvinyl resins [e.g., vinyl acetate (EVA), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, vinylidene chloride/methyl acrylate copolymer], cellulosic resins [e.g., cellulose acetate, cellulose acetate butyrate], fluoroethylene resins [e.g., polyvinylidene fluoride (PVDF), polyvinyl fluoride (PVF), polychlorotri-fluoroethylene (PCTFE), tetrafluoroethylene/ethylene copolymer (ETFE)], and imide resins [e.g., aromatic polyimide (PI)].

Examples of the elastomer (B) used for the inner liner include: diene rubber and its hydrogenated products [e.g., NR, IR, epoxidized natural rubber, SBR, BR (high cis BR and low cis BR), NBR, hydrogenated NBR, hydrogenated SBR], olefin rubber [e.g., ethylene-propylene rubber (EPDM, EPM), maleic acid modified ethylene-propylene rubber (M-EPM), butyl rubber (IIR), isobutylene and aromatic vinyl or diene monomer copolymer, acrylic rubber (ACM), ionomer, halogen-containing rubber [e.g., Br-IIR, Cl-IIR, bromine compound of isobutylene paramethylstyrene copolymer (Br-IPMS), chloroprene rubber (CR), epichlorohydrin rubber (CHC, CHR), chlorosulfonated polyethylene (CSM), chlorinated polyethylene (CM), maleic acid modified chlorinated polyethylene (M-CM)], silicon rubber (e.g., methyl vinyl silicon rubber, dimethyl silicon rubber, methylphenyl vinyl silicon rubber), Sulfur-containing rubber (e.g., polysulfide rubber), fluoro rubber (e.g., vinyliden fluoride rubber, fluorine-containing vinyl ether rubber, tetrafluoroethylene-propylene rubber, fluorine-containing silicon rubber, fluorine-containing polyphosphazene rubber), thermoplastic elastomers (e.g., styrene elastomer, olefin elastomer, polyester elastomer, urethane elastomer, polyamide elastomer).

For the thermoplastic elastomer composition (C) used for the inner liner, for example, a composition ratio of the thermoplastic resin (A) to the elastomer (B) may suitably be determined depending on the balance between the thickness and flexibility of the inner liner, but a preferable range thereof is that the thermoplastic resin (A)/the elastomer (B) is from 10/90 to 90/10, and more preferably from 20/80 to 85/15 (weight ratio).

In the thermoplastic elastomer composition (C) used for the inner liner, another polymer such as a compatibilizing agent, and a compounding agent can be mixed as third components in addition to the thermoplastic resin (A) and the elastomer (B). An object for mixing the another polymer is to improve the compatibility between the thermoplastic resin (A) and the elastomer (B), to improve film forming workability of materials, to improve heat resistance, to achieve cost reduction, and so forth. Examples of the material used for the above object include polyethylene, polypropylene, polystyrene, ABS, SBS, polycarbonate, and the like.

The thermoplastic elastomer composition (C) is obtained in such a way that the thermoplastic resin (A) and the elastomer (B) (an unvulcanized substance in the case of rubber) are melted and kneaded using a twin screw kneading extruder or the like, and the elastomer (B) is dispersed in the thermoplastic resin (A) forming a continuous phase. When vulcanizing the elastomer (B), a vulcanizing agent may be added during the kneading so that the elastomer (B) is dynamically vulcanized. Into the thermoplastic resin (A) or the elastomer (B), various compounding agents (not including vulcanizing agents) may be added during the kneading, but are preferably mixed in advance before kneading. There is no particular limitation on the kneading machine used for kneading the thermoplastic resin (A) or the elastomer (B), and examples of the kneading machine include a screw extruder, a kneader, a Banbury mixer, a twin screw kneading extruder, and the like. Of those, for the kneading of a resin component and a rubber component and for the dynamic vulcanization of a rubber component, a twin screw kneading extruder is preferably used. Further, two or more kneading machines may be used so that kneading is sequentially performed. On a melt-kneading condition, temperature may be not less than one at which the thermoplastic resin melts. Further, a shearing speed at the time of kneading is preferably from 2500 to 7500 $sec^{-1}$. The total time of kneading is preferably 30 sec to 10 min, and when adding a vulcanizing agent, vulcanizing time after the addition of the vulcanizing agent is preferably 15 sec to 5 min. The thermoplastic elastomer composition (C) made in the above-described manner is formed into a film as an inner liner by means of molding using a resin extruder, or by means of calendar molding. A film forming method may be one in which film molding is performed on a usual thermoplastic resin or on a usual thermoplastic elastomer.

An inner liner formed of a thin film of the thermoplastic elastomer composition (C) obtained in this manner is structured such that the elastomer (B) is dispersed as a discontinuous phase in a matrix of the thermoplastic resin (A). The dispersion structure in such a state allows Young's modulus to be set in a range of 1 to 500 MPa so that the inner liner is given an adequate rigidity as a tire component.

The present invention is described below using examples, but the scope of the invention is not limited to the examples.

EXAMPLES

Example 1

In order to manufacture a run-flat tire having a structure of FIG. 1, a pneumatic tire having a size of 245/40R18 was obtained in such a way that a pellet which is a thermoplastic elastomer composition adjusted in the following method is solved in toluene in an amount of 10 times that of the pellet, and the solution was applied, with a brush, to a surface of the inner liner on the side of a reinforcing rubber layer at the time of green tire molding to form a detection layer having a thickness of 30 μm and perform vulcanization molding.

[Adjustment of the Thermoplastic Elastomer Composition]

Raw materials were measured in accordance with the following compounding ratio, and a thermoplastic elastomer composition was kneaded at kneading temperature of 90° C. using a single screw extruder having an internal diameter 40 mm, and the thermoplastic elastomer composition was extruded in the form of strand. The thermoplastic elastomer composition was passed through an anti-adhesion agent, cooled down, cut in the form of a pellet using a pelletizer, and air-dried, so that pellets of the thermoplastic elastomer composition are obtained.

The softening point of this thermoplastic elastomer composition was measured with use of a DSC (temperature rising rate is 10° C./min), showing 110° C.

Epoxidized styrene-ethylene-butadiene-styrene block copolymer (EPOFRIEND AT501 produced by Daicel Chemical Industries, Ltd.); 85 parts by weight Polystyrene resin (GPSS produced by PS Japan); 10 parts by weight Adhesion providing resin (YS resin D115 produced by Yasuhara Chemical Co., Ltd.); 5 parts by weight Example 2

Using a pellet of the same thermoplastic elastomer composition as in Example 1, a sheet having a thickness of 30 μm was formed from a T die head using a single screw extruder. This sheet was cut at a predetermined width, and inserted between an inner liner and a reinforcing rubber layer, instead of a detection layer formed by the application using the brush, at the time of forming a run flat tire having the same structure as that of Example 1, so that a pneumatic tire having the same size as the tire of Example 1 was obtained by vulcanization formation.

Example 3

Unlike in the case of Example 1, the position of a detection layer was changed to that between a carcass layer and a sidewall, and except this difference, a pneumatic tire having the same tire size and structure as the tire of Example 1 was obtained.

Comparative Example

Unlike in the case of Example 1, a detection layer was not disposed, and except this difference, a pneumatic tire having the same tire size and structure as the tire of Example 1 was obtained.

Four types of tires (Example 1 to 3 and Comparative Example) obtained in the above-described manner were each mounted on a passenger car of 4300 cc on the front and left side thereof. Each of the tires was deflated to zero inflation pressure, and the valve was removed. After a driving at speed of 90 k/m for 200 km, the tire was removed from the rim and an inner surface of the tire was observed. Then, the tire was disassembled and whether there was an internal failure was checked. The results are shown in Table 1.

TABLE 1

|  | Example 1 | Example 2 | Example 3 | Comparative Example |
|---|---|---|---|---|
| Observation of inner surface of tire | Detection layer was bulged out due to detachment | Detection layer was bulged out due to detachment | Detection layer was bulged out due to detachment | No abnormality was found on the external appearance |
| Presence or absence of internal failure of tire | At least one carcass cord was broken | At least one carcass cord was broken | At least one carcass cord was broken | At least one carcass cord was broken |

As shown in Table 1, for the tires of Examples 1 to 3 and Comparative Example, at least one carcass cord was broken due to run flat driving assuming that blowout has occurred. On the inner surface of the tire of Comparative Example, no abnormality was viewed from the outside. Meanwhile, on each tire of Examples 1 to 3, detachment was easily viewed on the inside of the tire corresponding to a portion on which a detection layer was interposed. Here, the presence or not of the occurrence of an internal failure can be easily estimated.

What is claimed is:

1. A pneumatic tire comprising a detection layer interposed in an interlayer between materials constituting the tire, the detection layer mainly composed of at least one of a thermoplastic elastomer and a thermoplastic resin, which has a softening point of 50° C. to 150° C., wherein the thickness of the detection layer is 5 μm to 500 μm, and further wherein when the temperature of the detection layer reaches the softening point, the detection layer softens, and a bulge is formed on the inside of the pneumatic tire.

2. The pneumatic tire according to claim 1, wherein the detection layer is constituted of a thermoplastic composition containing 0 or not more than 0.1 parts by weight of a crosslinking agent per 100 parts by weight of the thermoplastic elastomer.

3. The pneumatic tire according to claim 1, wherein the detection layer is interposed in the interlayer located closer to the center of the tire than a carcass layer.

4. The pneumatic tire according to claim 3, further comprising a tie rubber interposed between the carcass layer and an inner liner, wherein the detection layer is interposed between the inner liner and the tie rubber.

5. The pneumatic tire according to claim 1, wherein the detection layer is interposed in the interlayer located farther from the center of the tire than a carcass layer.

6. The pneumatic tire according to claim 5, wherein the detection layer is interposed between the carcass layer and a sidewall.

7. A pneumatic tire comprising a detection layer interposed in an interlayer between materials constituting the tire, the detection layer mainly composed of at least one of a thermoplastic elastomer and a thermoplastic resin, which has a softening point of 50° C. to 150° C., wherein the thickness of the detection layer is 5 μm to 500 μm, and wherein the detection layer is disposed in a region extending at least by $0.6 \times H$ to $0.7 \times H$ from a bead portion in a tire radial direction, where H represents a section height of the tire.

8. The pneumatic tire according to claim 1, wherein the pneumatic tire is a run-flat tire into which a reinforcing rubber layer formed of hard rubber having a crescent-shaped section is inserted closer to the center of the tire than a carcass layer.

9. The pneumatic tire according to claim 7, wherein the detection layer is constituted of a thermoplastic composition containing 0 or not more than 0.1 parts by weight of a crosslinking agent per 100 parts by weight of the thermoplastic elastomer.

10. The pneumatic tire according to claim 7, wherein the detection layer is interposed in the interlayer located closer to the center of the tire than a carcass layer.

11. The pneumatic tire according to claim 10, further comprising a tie rubber interposed between the carcass layer and an inner liner, wherein the detection layer is interposed between the inner liner and the tie rubber.

12. The pneumatic tire according to claim 7, wherein the detection layer is interposed in the interlayer located farther from the center of the tire than a carcass layer.

13. The pneumatic tire according to claim 12, wherein the detection layer is interposed between the carcass layer and a sidewall.

14. The pneumatic tire according to claim 7, wherein the pneumatic tire is a run-flat tire into which a reinforcing rubber layer formed of hard rubber having a crescent-shaped section is inserted closer to the center of the tire than a carcass layer.

* * * * *